C. Monson,
Pipe Coupling.
Nº 19,944.   Patented Apr. 13, 1858.
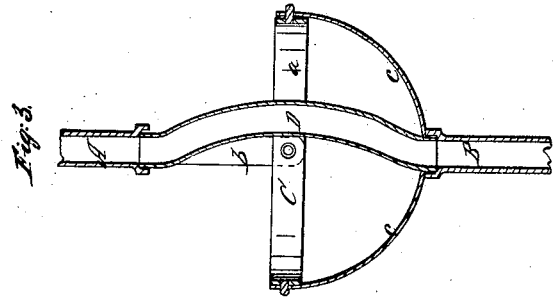
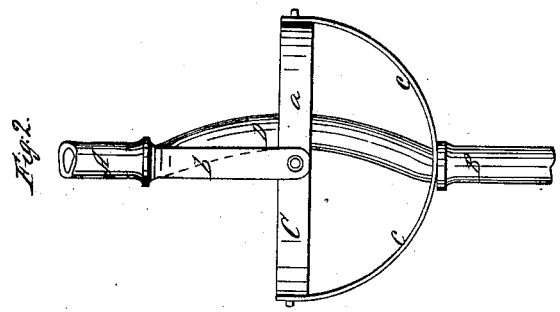
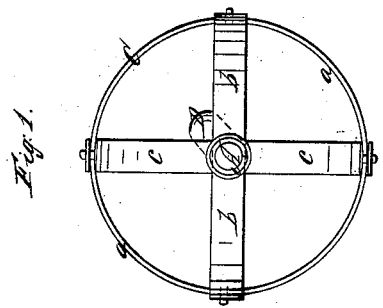

UNITED STATES PATENT OFFICE.

CHAS. MONSON, OF NEW HAVEN, CONNECTICUT.

CONDUIT-JOINT FOR GAS-PIPES.

Specification of Letters Patent No. 19,944, dated April 13, 1858.

*To all whom it may concern:*

Be it known that I, CHARLES MONSON, of the city and county of New Haven and State of Connecticut, have invented a new and useful Conduit-Joint; and I do hereby declare that the same is fully described and represented in the following specification and the accompanying drawings, of which—

Figure 1, is a top view, Fig. 2, a side elevation; and Fig. 3, a vertical section of two leading tubes connected by such conduit joint.

The object of the said conduit joint is to enable the direction of a flowing current, whether of gas, a fluid, or vapor to be changed as circumstances may require.

It is particularly designed for gas light apparatus, where much scope and variety of movement may be desirable in one conduit tube thereof with respect to another. As applied to a gas burner or chandelier depending from the ceiling, the conduit joint is far preferable to a stiff, immovable rod or to a simple joint which will permit the chandelier or burner to be moved or swung in one plane only. It also has advantages over the well known ball and socket conduit joint, as when properly constructed, it needs no packing to prevent it from leaking, a slight amount of lubrication of the rubbing surface sufficing to render it gas tight. My said conduit joint will often be found useful to connect a burner or chandelier with a conduit tube extending from a vertical wall.

On the 19th day of January, A. D. 1858, Letters Patent of the United States of America for a conduit universal joint were granted to me, such Letters Patent having been since surrendered and reissued on an amended specification and claim. In the reissued patent, I described and claimed a conduit universal joint made with armed branches and a connection cross jointed together and provided with one or more passages so arranged in them as to open a communication from one leading tube to the other connection by such joint. My present invention, as exhibited in the drawings differs from this latter, inasmuch as it has no tubular connection cross, and a passage leading through the same and any armed branches, so as to open a communication between the leading tubes, but the armed branches are jointed to a solid ring or its equivalent so as to form a universal joint, while a separate flexible tube is extended from one leading tube to the other and so connected with them as to open a communication for a fluid or gas to pass from one leading tube into the other, the universal joint serving to so connect the two leading pipes in such manner as to not only allow one to be arranged or put into an angular or various angular positions with respect to the other but at the same time to relieve the flexible connecting tube from injurious tensile strain, any force tending to draw one leading tube away from the other being borne by the universal or connecting joint.

In the drawings, A, and B, exhibit the two leading tubes connected by a universal joint, C, formed of a ring, a, or its equivalent and two branches or arms, b, b, or c, c, projecting from each leading tube, and jointed to the ring. Extending from one leading tube A, to the other, B, is a flexible tube D, constructed of caoutchouc or other suitable material or materials and made of such length as to allow of the free movements of the parts, of the connecting or universal joint in any desired direction or directions, such tube D, being so conjoined with the two leading tubes as to open a communication from one to the other in such manner as to direct and convey a fluid or a gas from one to the other when forced through one of them and toward the other.

The principle of my invention therefore is the mode of connecting two leading tubes, viz., by a flexible tube and a joint which will not only allow one tube to be moved into an angular position with respect to the other tube, but so connect the two leading tubes as to relieve the flexible tube from any injurious longitudinal or tension strain. Thus, in my present invention, the joint does not become the means of communication or conduit from one tube to the other, but has a separate flexible conduit arranged either within or without it, as circumstances may require.

Therefore what I claim is—

The above described new mode of connecting two leading tubes, A, B, viz., by a flexible tube D, and a joint which will not only allow one tube to be moved into one or more angular positions with respect to the other tube but so connect the two leading tubes as to relieve the flexible tube from injurious longitudinal or tensile strain as specified.

In testimony whereof, I have hereunto set my signature.

CHARLES MONSON.

Witnesses:
 A. S. MONSON,
 M. A. MONSON.